Figure 1:
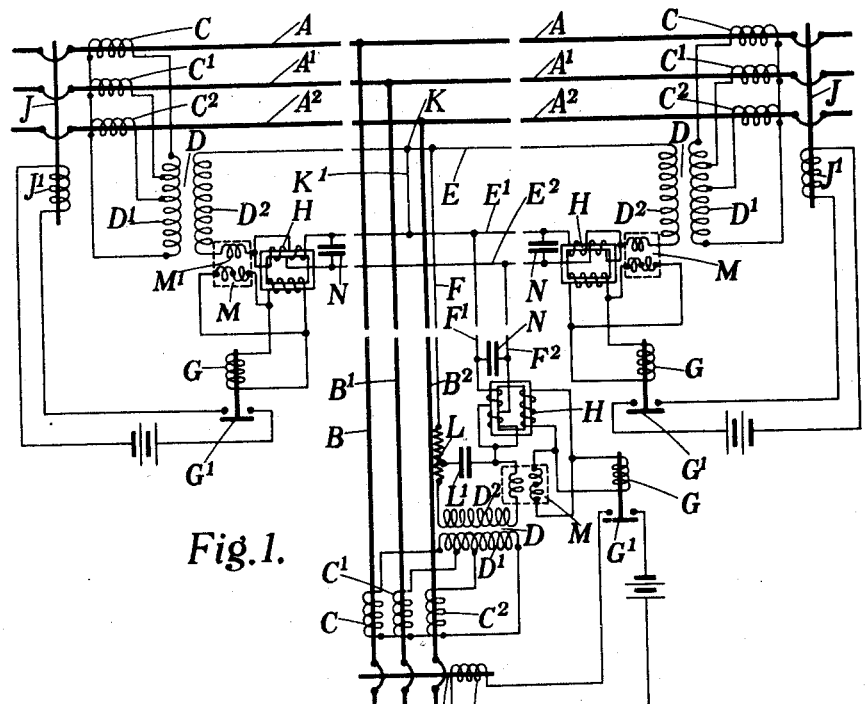

March 8, 1932.     H. LEBEN     1,849,011

ELECTRIC PROTECTIVE SYSTEM

Filed May 20, 1930

INVENTOR
Henry Leben,
BY
Watson, Coit, Morse & Grindle,
ATTORNEYS

Patented Mar. 8, 1932

1,849,011

UNITED STATES PATENT OFFICE

HENRY LEBEN, OF HARROW, ENGLAND, ASSIGNOR TO A. REYROLLE & COMPANY LIMITED, OF HEBBURN-ON-TYNE, ENGLAND, A COMPANY OF GREAT BRITAIN

ELECTRIC PROTECTIVE SYSTEM

Application filed May 20, 1930, Serial No. 454,171, and in Great Britain June 5, 1929.

This invention relates to protective systems for electric feeders or other circuits having one or more T connected branches and more particularly to such systems of the Merz-Price type wherein the protective gear is brought into operation as a result of the disturbance of the normal balance between the total current entering the protected circuit and the total current leaving that circuit.

In such systems, as usually arranged, the secondaries of current transformers at the ends of the main circuit and of the branches or branches are connected together by pilot wires in such manner that there is normally a balance of E. M. F.'s in the pilot circuit, the tripping relays being connected in series with the pilot circuit, so that normally no current flows through the relays.

In protective systems of this type when applied to feeders or other circuits with widely separated ends, difficulty has been experienced in preventing the undesired operation of the protective relays as the result of the heavy capacity currents which flow in the pilot circuit when a severe fault occurs on a part of the main system external to the protected section. Furthermore in such systems when applied to T connected circuits, inadvertent operation of one or more of the tripping relays has been found to take place during earth faults outside the protected circuit as a result of differences in earth potential at the ends of the pilot cables during the flow of the earth fault current.

The object of the present invention is to provide a protective system for feeders or other circuits having one or more T connected branches which shall be immune from the undesired or inadvertent operation of the tripping relays due to either of the causes set forth above.

The protective system according to this invention comprises the combination with a three-wire pilot circuit extending between the ends of the main feeder, of a three-wire pilot circuit for each branch with its pilot wires T connected to the corresponding pilot wires of the main pilot circuit, current transformers at the ends of the main feeder and branches so arranged that a current depending on the conditions at the ends of the protected circuit normally circulates in the pilot system, relays or other tripping devices so connected at the ends of the pilot circuit that normally they remain unaffected by the circulating currents and capacity currents in that circuit, and a short-circuiting or other connection between equipotential points on two of the three pilot wires such that on the occurrence of a fault in the protected circuit an operative current flows through the relays or tripping devices.

In practice the feeder system is generally such that the T connected branches are irregularly spaced and are of different lengths, so that the lengths of the "legs" of the pilot circuit differ from one another with the result that equipotential points on the pilot wires may be spaced far apart and could only be connected by an additional pilot wire. To avoid such additional pilot wires means, such as resistances, may be arranged in the branch pilot wires and/or in the main pilot wires whereby the equi-potential points in the three pilot wires are brought to the same position in the system. If desired condensers may be associated with the resistances to provide capacities approximately equivalent to the distributed capacities of the lengths of pilot wire to which the resistances correspond.

Conveniently the pilot wires are energized and connected up at their ends in such a way that two of the pilot wires constitute a pair of "split" pilot wires, or that one of the pilot wires is a "neutral" pilot wire.

Figure 2:
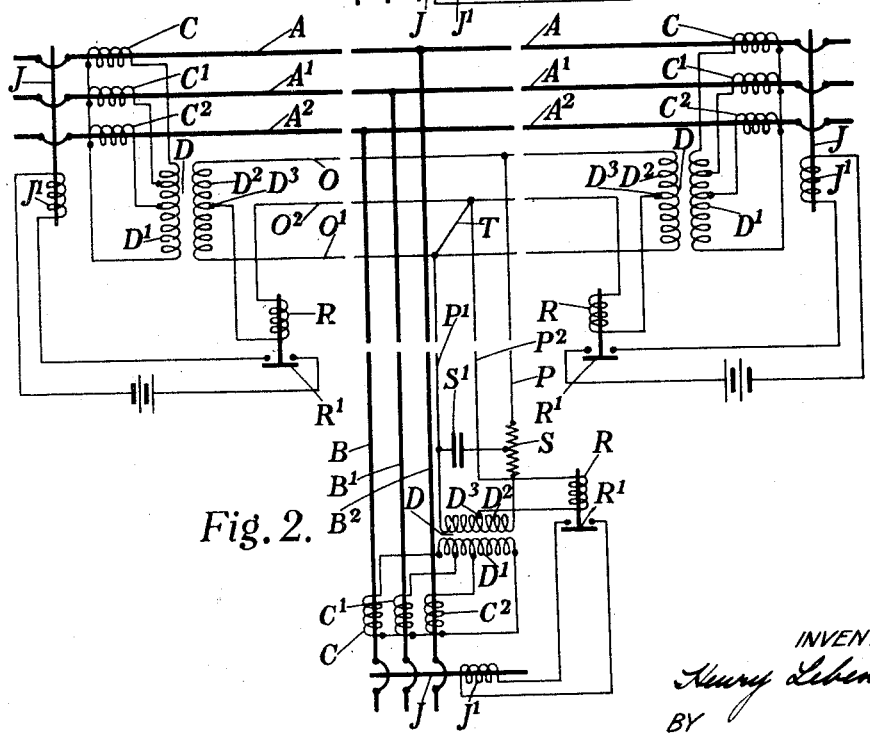

The invention may be carried into practice in various ways and two convenient arrangements in which it is applied to a three-phase feeder having a single T connected branch will now be described by way of example with reference to the accompanying drawings, in which Figure 1 shows a wiring diagram of the preferred ararngement, and Figure 2 shows a wiring diagram of an alternative arrangement.

In both arrangements three single phase current transformers $C$, $C^1$, $C^2$, having equal ratios, are arranged one in each phase at each end of the main feeder A A¹ A² and at the end of the branch feeder B B¹ B². The secondary windings of the three transformers C, C¹, C² are connected in star and the star point is connected to one end of the primary winding D¹ of a summation transformer D. The free ends of the secondary windings of the current transformers C, C¹, C² are respectively connected to three tapping points on the primary winding D¹ so as to provide a discriminating transformer arrangement in which the sensitivity to interphase faults is independent of and preferably less than the sensitivity to earth faults.

The two arrangements differ from one another mainly in respect of the manner in which the pilot wires are connected up and will now be separately described. In the preferred arrangement shown in Figure 1 the secondary windings D² of the summation transformers D at the two ends of the main feeder A A¹ A² are connected together on one side by a single pilot wire E and on the other side by two parallel connected pilot wires E¹, E² termed the "split" pilot wires. The secondary winding D² of the summation transformer D at the end of the T'd branch B B¹ B² has one side connected to a single pilot wire F T-connected to the main single pilot wire E and the other side connected to two split pilot wires F¹, F² respectively T-connected to the two main split pilot wires E¹, E². The secondary windings D² of the three summation transformers are arranged to assist one another so that a current normally circulates round the pilot circuit flowing in one direction through the two split pilot wires and in the other direction through the single pilot wire.

A protective relay G is provided at each end of the main pilot circuit and at the end of the branch pilot circuit and is connected to the secondary winding of an auxiliary transformer H having two primary windings respectively in series with the two split pilot wires E¹, E² or F¹, F². The primary windings of each of the transformers H are differentially connected so that the relay remains inoperative as long as equal currents are flowing in the same direction in the split pilot wires. Each tripping relay G is arranged to control at its normally open contacts G¹, the trip coil J¹ of the circuit-breaker J at the adjacent end of the protected circuit. If desired a differential tripping relay having two coils in series respectively with the two split pilot wires may be provided instead of the single protective relay and the differential auxiliary transformer H. The arrangement shown in the figure has, however, the advantage that the tripping relay is isolated from the pilot circuit.

It will be apparent that the circulating current, and also the capacity current, is normally divided equally between the two split pilot wires so that the relays G are normally inoperative. Furthermore, it can be shown that under normal conditions or with straight-through fault currents passing through the main feeder or the main feeder and the T-connected branch feeder there will be an equipotential point in the pilot wires E, E¹, E² at an electrical mid-point K in a definite position (depending upon the relative lengths of the legs of the pilot wires from the T point) in the longest leg provided that the other two legs are of equal length or are electrically equal to one another.

In the arrangement shown in Figure 1 it has been assumed that the leg of the pilot wire system extending from the T point to the left-hand end of the main feeder is the longest leg and that the leg of the pilot wire system extending from the T point to the end of the branch feeder is the shortest leg. In order to make the shortest leg electrically equal to the leg extending from the T point to the right-hand end of the main feeder a resistance L is inserted in the pilot wire F. If desired, a condenser L¹ can be connected between the pilot wires so as to provide a capacity approximately equivalent to the distributed capacity of the length of pilot wire to which the resistance L corresponds.

With this arrangement the pilot wires E, E¹, E² remain equipotential at the electrical mid-point K not only when there is a straight-through fault current passing through two ends of the protected circuit but also when the through fault current divides between the three ends irrespective of whether the current flowing in one leg of the pilot wire system divides equally or unequally between the other two legs, since the sum of the voltage drops in the legs carrying the smaller currents will always be equal to the voltage drop in the leg carrying the largest current.

The pilot wire circuit thus remains stable under all conditions and, in order to obtain operation of the tripping relays G under fault conditions, the pilot wire E is connected to the pilot wire E¹ at the electrical mid-point K either directly by a short-circuiting connection K¹ or through a resistance or a reactive connection. This connection will not disturb the normal conditions but is such as to cause the currents flowing through the two split pilot wires E¹, E² or F¹, F² to differ from one another under the internal fault conditions so that the secondary winding of one or more of the auxiliary transformers H is energized and the associated protective relay or relays G operated to cut out the protected circuit.

It will be appreciated that if the branch feeder B B¹ B² is T-connected to the main feeder A A¹ A² at its mid-point and is of the same length as half the main feeder the T points of the pilot wires will themselves be equipotential points and connection $K^1$ can then be made at this point. Furthermore, if desired, the T point can always be made the equipotential point by inserting suitable resistances in the two shorter legs of the pilot wire system so that the three legs are made electrically equal to each other.

If desired the sensitivity of each tripping relay G can be varied by means of a variable reactance M. This reactance, which is wound on an iron core, is connected in shunt across the tripping relay and is provided with an exciting coil $M^1$ connected in series in the pilot wire circuit so that the flux density in the iron core is varied in accordance with the current circulating in the pilot wire circuit, the main shunt reactance coil M and the exciting coil $M^1$ being so wound on the core that the exciting coil $M^1$ has no resultant inductive effect on the shunt coil M. In one convenient arrangement the main coil M is wound in two halves respectively on the outer limbs of a three-limbed core, and the exciting coil $M^1$ is wound on the centre limb so as to produce fluxes in the core which traverse the outer limbs in such directions that the inductive effects on the two halves of the shunt coil neutralize one another.

Since the exciting coil $M^1$ is energized in accordance with the current flowing in the protected circuit, the effect of variations in the magnitude of such current is to vary the flux density in the outer limbs of the core and therefore also to vary the reactance of the main shunt coil M. Thus as the current flowing in the protected circuit increases the reactance of the coil M first of all increases slightly until the core becomes saturated, after which it decreases rapidly. The result is that the sensitivity of the relay increases slightly at first and then decreases rapidly due to the shunting effect of the coil M. The system is thus rendered much more stable during the passage of heavy straight-through currents due, for example, to a fault outside the protected section.

Furthermore, the pilot circuit may be tuned by the insertion in it of suitable condensers N (and/or inductances) so as to render the relays G immune from the effects of high frequency disturbances.

In the arrangement shown in Figure 2, the output leads of the secondary windings $D^2$ of the two summation transformers at the ends of the main feeder are connected to each other by two pilot wires O, $O^1$ to which are T-connected two branch pilot wires P $P^1$ connected to the output leads of the secondary winding $D^2$ of the summation transformer D at the end of the branch feeder B $B^1$ $B^2$, the secondary windings of the three transformers being so arranged that they normally assist one another in circulating a current through the pilot wires.

A mid-point tapping connection $D^3$ is provided on the secondary windings $D^2$ of each of the two summation transformers at the end of the main feeder and these tapping points are connected by a third or "neutral" pilot wire $O^2$ to which is T-connected the neutral pilot wire $P^2$ from a corresponding tapping point $D^3$ on the secondary winding $D^2$ of the summation transformer D of the branch feeder. A tripping relay R is connected in series with the neutral pilot wire at each end of the main feeder and at the end of the branch feeder these relays respectively controlling at their normally open contacts $R^1$ the trip coil $J^1$ of the circuit-breaker J at the adjacent end.

The neutral pilot wires $O^2$ and $P^2$ are thus normally maintained throughout their lengths at a potential mid-way between the potentials of the other two pilot wires O $O^1$ and P $P^1$ respectively so that there will be no capacity current flow in the neutral wires. As shown in Figure 2, it is assumed that the branch feeder B $B^1$ $B^2$ is T-connected to the mid-point of the main feeder A $A^1$ $A^2$ and that it is shorter than either of the legs of the main feeder. Accordingly, the length of the pilot wires P $P^1$ is made electrically equivalent to the length of the pilot wires O $O^1$ from the T point to either end by connecting in the pilot wire P a resistance S. A condenser $S^1$ which has a capacity approximately equivalent to the distributed capacity of the length of pilot wire to which the resistance S corresponds is also connected between the pilot wires P and $P^1$ when the difference between the length of the legs of the pilot wire system for which the resistance S compensates is large.

The T point of the pilot wires is thus the electrical mid-point and the three pilot wires are equipotential at this point. In order that an operative current shall flow through the tripping relays R under fault conditions this equipotential point on the neutral pilot wire is connected to the corresponding point on one of the other pilot wires (pilot wire $O^1$ in the figure) either directly by a short-circuiting connection T or through a resistance or a reactance. Since these points are normally equipotential the connection T will not affect the normal condition and the relays will thus remain unaffected either by the circulating current or by capacity currents while on the occurrence of an internal fault a current will flow through the connection T and the neutral pilot wires $O^2$ and $P^2$ to effect the operation of the relays R and the isolation of the protected circuit.

When the lengths of the three legs of the pilot system are unequal additional resistances with or without condensers may be provided where necessary as already described with reference to the arrangement shown in Figure 1 to bring the equipotential points together at the T point or at some other position on the pilot system. As in the arrangement shown in Figure 1, the protective relays may, if desired, have their sensitivity varied by means of a variable reactance and may be tuned by suitable condensers so as to render them immune from the effects of high frequency disturbances.

It will be appreciated that either of the arrangements described can be applied to the protection of a feeder having two or more T-connected branches, resistances being provided where necessary to enable the equipotential points to be brought together at a convenient position on the pilot system.

In both the above arrangements the current transformers have been described as connected to the pilot circuit through summation transformers, but if desired these summation transformers may be replaced by a summation resistance or a summation choke coil (auto-transformer).

It will be appreciated that the above description is given by way of example only and that many modifications may be made within the scope of the invention.

What I claim as my invention and desire to secure by Letters Patent is:—

1. In a balanced protective system for a main feeder having at least one T-connected branch feeder, the combination of a circuit-breaker at each end of the main feeder and at the end of each branch feeder, a pilot wire system comprising a three-wire main pilot circuit extending between the ends of the main feeder and a three-wire branch pilot circuit for each branch feeder with its pilot wires T-connected to the corresponding pilot wires of the main pilot circuit, current transformers at the ends of the main feeder and at the end of each branch feeder so associated with the adjacent ends of the pilot wire system that a current depending upon the conditions at the ends of the protected circuit normally circulates in the pilot wire system, a tripping relay device for the adjacent circuit-breaker at each end of the main feeder and at the end of each branch feeder so associated with the pilot wire system that the circulating currents and capacity currents normally flowing in that system are neutralized in respect to the relay device, and a connection between equipotential points on two of the three pilot wires so that on the occurrence of a fault in the protected circuit an operating current flows through at least one of the tripping relay devices.

2. In a balanced protective system for a main feeder having at least one T-connected branch feeder, the combination of a circuit-breaker at each end of the main feeder and at the end of each branch feeder, a pilot wire system comprising a three-wire main pilot circuit extending between the ends of the main feeder and a three-wire branch pilot circuit for each branch feeder with its pilot wires T-connected to the corresponding pilot wires of the main pilot circuit, current transformers at the ends of the main feeder and at the end of each branch feeder so associated with the adjacent ends of the pilot wire system that a current depending upon the conditions at the ends of the protected circuit normally circulates in the pilot wire system, a tripping relay device for the adjacent circuit-breaker at each end of the main feeder and at the end of each branch feeder so associated with the pilot wire system that the circulating currents and capacity currents normally flowing in that system are neutralized in respect to the relay device, means such as resistances arranged in the pilot wire system for providing equipotential points in the three pilot wires at the same position on the system, and a connection between equipotential points on two of the three pilot wires so that on the occurrence of a fault in the protected circuit an operating current flows through at least one of the tripping relay devices.

3. In a balanced protective system for a main feeder having at least one T-connected branch feeder, the combination of a circuit-breaker at each end of the main feeder and at the end of each branch feeder, a pilot wire system comprising a three-wire main pilot circuit extending between the ends of the main feeder and a three-wire branch pilot circuit for each branch feeder with its pilot wires T-connected to the corresponding pilot wires of the main pilot circuit, current transformers at the ends of the main feeder and at the end of each branch feeder so associated with the adjacent ends of the pilot wire system that a current depending upon the conditions at the ends of the protected circuit normally circulates in the pilot wire system, a tripping relay device for the adjacent circuit-breaker at each end of the main feeder and at the end of each branch feeder so associated with the pilot wire system that the circulating currents and capacity currents normally flowing in that system are neutralized in respect to the relay device, means such as resistances arranged in the pilot wire system for providing equipotential points in the three pilot wires at the same position on the system, condensers associated with said means so as to provide a capacity approximately equivalent to the distributed capacity of the lengths of pilot wire to which the means correspond, and a connection between equipotential points on two of the three pilot wires so that on the occurrence of a fault in the protected circuit an operating current flows through at least one of the tripping relay devices which operates to open the adjacent circuit-breaker.

4. In a balanced protective system for a main feeder having at least one T-connected branch feeder, the combination of a circuit-breaker at each end of the main feeder and at the end of each branch feeder, a pilot wire system comprising a three-wire main pilot circuit extending between the ends of the main feeder and a three-wire branch pilot circuit for each branch feeder with its pilot wires T-connected to the corresponding pilot wires of the main pilot circuit, the outer ends of two of the main pilot wires and the outer ends of the corresponding two pilot wires of each branch being connected together so as to constitute a pair of "split" pilot wires, current transformers at the ends of the main feeder and at the end of each branch feeder so associated with the adjacent ends of the pilot wire system that a current depending upon the conditions at the ends of the protected circuit normally circulates in the pilot wire system, a tripping relay device for the adjacent circuit-breaker at each end of the main feeder and at the end of each branch feeder so associated with the two "split" pilot wires that the circulating currents and capacity currents normally flowing in that system are neutralized in respect to the relay device, and a connection between equipotential points on one of the "split" pilot wires and the third pilot wire so that on the occurrence of a fault in the protected circuit an operating current flows through at least one of the tripping relay devices.

5. In a balanced protective system for a main feeder having at least one T-connected branch feeder, the combination of a circuit-breaker at each end of the main feeder and at the end of each branch feeder, a pilot wire system comprising a three-wire main pilot circuit extending between the ends of the main feeder and a three-wire branch pilot circuit for each branch feeder with its pilot wires T-connected to the corresponding pilot wires of the main pilot circuit, the outer ends of two of the main pilot wires and the outer ends of the corresponding two pilot wires of each branch being connected together so as to constitute a pair of "split" pilot wires, current transformers at the ends of the main feeder and at the end of each branch feeder so associated with the adjacent ends of the pilot wire system that a current depending upon the conditions at the ends of the protected circuit normally circulates in the pilot wire system, a tripping relay device for the adjacent circuit-breaker at each end of the main feeder and at the end of each branch feeder so associated with the two "split" pilot wires that the circulating currents and capacity currents normally flowing in that system are neutralized in respect to the relay device, means such as resistances arranged in the pilot wire system for providing equipotential points in the three pilot wires at the same position on the system, condensers associated with said means so as to provide a capacity approximately equivalent to the distributed capacity of the lengths of pilot wire to which the means correspond, and a connection between equipotential points on one of the "split" pilot wires and the third pilot wire so that on the occurrence of a fault in the protected circuit an operating current flows through at least one of the tripping relay devices.

6. In a balanced protective system for a main feeder having a T-connected branch feeder, the combination of a circuit-breaker at each end of the main feeder and at the end of the branch feeder, a pilot wire system comprising a three-wire main pilot circuit extending between the ends of the main feeder and a three-wire branch pilot circuit for the branch feeder with its pilot wires T-connected to the corresponding pilot wires of the main pilot circuit, current transformers at the ends of the main feeder and at the end of the branch feeder so associated with the adjacent ends of the pilot wire system that a current depending upon the conditions at the ends of the protected circuit normally circulates in the pilot wire system, a resistance arranged in the shortest leg of the pilot wire system for making the length thereof electrically equivalent to the length of the shorter of the other two legs, a tripping relay device for the adjacent circuit-breaker at each end of the main feeder and at the end of the branch feeder so associated with the adjacent end of the pilot system that the circulating currents and capacity currents normally flowing in that system are neutralized in respect to the relay device, and a short-circuiting connection between equipotential points on two of the three pilot wires so that on the occurrence of a fault in the protected circuit an operating current flows through at least one of the tripping relay devices.

7. In a balanced protective system for a main feeder having a T-connected branch feeder, the combination of a circuit-breaker at each end of the main feeder and at the end of the branch feeder, a pilot wire system comprising a three-wire main pilot circuit extending between the ends of the main feeder and a three-wire branch pilot circuit for the branch feeder with its pilot wires T-connected to the corresponding pilot wires of the main pilot circuit, current transformers at the ends of the main feeder and at the end of the branch feeder so associated with the adjacent ends of the pilot wire system that a current depending upon the conditions at the ends of the protected circuit normally circulates in the pilot wire system, a resistance arranged in the shortest leg of the pilot wire system for making the length thereof electrically equivalent to the length of the shorter of the other two legs, a condenser associated with the resistance so as to provide a capacity approximately equivalent to the distributed capacity of the length of pilot wire to which the resistance corresponds, a tripping relay device for the adjacent circuit-breaker at each end of the main feeder and at the end of the branch feeder so associated with the adjacent end of the pilot system that the circulating currents and capacity currents normally flowing in that system are neutralized in respect to the relay device, and a short-circuiting connection between equipotential points on two of the three pilot wires so that on the occurrence of a fault in the protected circuit an operating current flows through at least one of the tripping relay devices.

8. In a balanced protective system for a multiphase main feeder having a T-connected branch feeder, the combination of a circuit-breaker at each end of the main feeder and at the end of the branch feeder, a pilot wire system comprising a three-wire main pilot circuit extending between the ends of the main feeder and a three-wire branch pilot circuit for the branch feeder with its pilot wires T-connected to the corresponding pilot wires of the main pilot circuit, current transformers in each phase of the protected circuit at the ends of the main feeder and at the end of the branch feeder, a summation transformer at each end of the main feeder and at the end of the branch feeder, a primary winding on each summation transformer connected to the current transformers at the adjacent end so as to provide a discriminating transformer arrangement, a secondary winding on each summation transformer connected to the adjacent ends of the pilot wire system so that a current depending upon the conditions at the ends of the protected circuit normally circulates in the pilot wire system, a resistance arranged in the shortest leg of the pilot wire system for making the length thereof electrically equivalent to the length of the shorter of the other two legs, a tripping relay device for the adjacent circuit-breaker at each end of the main feeder and at the end of the branch feeder so associated with the adjacent end of the pilot system that the circulating currents and capacity currents normally flowing in that system are neutralized in respect to the relay device, and a connection between equipotential points on two of the three pilot wires so that on the occurrence of a fault in the protected circuit an operating current flows through at least one of the tripping relay devices.

9. In a balanced protective system for a multiphase main feeder having a T-connected branch feeder, the combination of a circuit-breaker at each end of the main feeder and at the end of the branch feeder, a pilot wire system comprising a three-wire main pilot circuit extending between the ends of the main feeder and a three-wire branch pilot circuit for the branch feeder with its pilot wires T-connected to the corresponding pilot wires of the main pilot circuit, the outer ends of two of the main pilot wires and the outer ends of the corresponding two pilot wires of the branch being connected together so as to constitute a pair of "split" pilot wires, current transformers in each phase of the protected circuit at the ends of the main feeder and at the end of the branch feeder, a summation transformer at each end of the main feeder and at the end of the branch feeder, a primary winding on each summation transformer connected to the current transformers at the adjacent end so as to provide a discriminating transformer arrangement, a secondary winding on each summation transformer connected on one side to the adjacent end of the pair of "split" pilot wires and on the other side to the adjacent end of the third pilot wire, the secondary windings of the three summation transformers being connected so that the currents they supply to the pilot system are normally additive, a resistance connected in series in the third pilot wire of the shortest leg of the pilot wire system for making the length of the leg electrically equivalent to the length of the shorter of the other two legs and thus providing equipotential points in the three pilot wires at the same position on the system, a tripping relay device for the adjacent circuit-breaker at each end of the main feeder and at the end of the branch feeder so associated with the "split" pilot wires at the adjacent end that circulating currents and capacity currents normally flowing in the pilot wire system are neutralized in respect to the relay device, and a connection between equipotential points on one of the "split" pilot wires and the third pilot wire so that on the occurrence of a fault in the protected circuit an operating current flows through at least one of the tripping relay devices.

10. In a balanced protective system for a multiphase main feeder having at least one T-connected branch feeder, the combination of a circuit-breaker at each end of the main feeder and at the end of each branch feeder, a pilot wire system comprising a three-wire main pilot circuit extending between the ends of the main feeder, and a three-wire branch pilot circuit for each branch feeder with its pilot wires T-connected to the corresponding pilot wires of the main pilot circuit, current transformers in each phase of the protected circuit at the ends of the main feeder and at the end of each branch feeder, a summation transformer at each end of the main feeder and at the end of each branch feeder, a primary winding on each summation transformer connected to the current transformers at the adjacent end so as to provide a discriminating transformer arrangement, a secondary winding on each summation transformer connected to the adjacent end of the pilot wire system, the secondary windings of the summation transformers being connected so that the currents they supply to the pilot wire system are normally additive means connected in the pilot wire system for providing equipotential points in the three pilot wires at the same position on the system, a tripping relay device for the adjacent circuit-breaker at each end of the main feeder and at the end of each branch feeder so associated with the pilot wire system at the adjacent end that circulating currents and capacity currents normally flowing in the pilot wire system are neutralized in respect to the relay device, means for varying the sensitivity of each tripping relay device, and a short-circuiting connection between equipotential points on two of the three pilot wires so that on the occurrence of a fault in the protected circuit an operating current flows through at least one of the tripping relay devices.

11. In a balanced protective system for a main feeder having a T-connected branch feeder, the combination of a circuit-breaker at each end of the main feeder and at the end of the branch feeder, a pilot wire system comprising a three-wire main pilot circuit extending between the ends of the main feeder and a three-wire branch pilot circuit for the branch feeder with its pilot wires T-connected to the corresponding pilot wires of the main pilot circuit, the outer ends of two of the main pilot wires and the outer ends of the corresponding two pilot wires of the branch being connected together so as to constitute a pair of "split" pilot wires, current transformers at the ends of the main feeder and at the end of the branch feeder so associated with the adjacent ends of the pilot wire system that a current depending upon the conditions at the ends of the protected circuit normally circulates in the pilot wire system, means arranged in the pilot wire system for providing equipotential points in the three pilot wires at the same position on the system, an auxiliary transformer at each end of the main feeder and at the end of the branch feeder having two similar primary windings respectively connected in series in opposition in the two pilot wires constituting the pair of "split" pilot wires, a tripping relay device for each circuit-breaker connected to the secondary winding of the adjacent auxiliary transformer so that it is operated to open the circuit-breaker when the currents flowing through the "split" pilot wires are unequal, and a short-circuiting connection between normally equipotential points on one of the "split" pilot wires and the third pilot wire so that the currents flowing in the "split" pilot wires are unequal when there is a fault in the protected section.

12. In a balanced protective system for a multiphase main feeder having a T-connected branch feeder, the combination of a circuit-breaker at each end of the main feeder and at the end of the branch feeder, a pilot wire system comprising a three-wire main pilot circuit extending between the ends of the main feeder and a three-wire branch pilot circuit for the branch feeder with its pilot wires T-connected to the corresponding pilot wires of the main pilot circuit, the outer ends of two of the main pilot wires and the outer ends of the corresponding two pilot wires of the branch being connected together so as to constitute a pair of "split" pilot wires, current transformers in each phase of the protected circuit at the ends of the main feeder and at the end of the branch feeder, a summation transformer at each end of the main feeder and at the end of the branch feeder, a primary winding on each summation transformer connected to the current transformers at the adjacent end so as to provide a discriminating transformer arrangement, a secondary winding on each summation transformer connected on one side to the adjacent end of the pair of "split" pilot wires and on the other side to the adjacent end of the third pilot wire, the secondary windings of the three summation transformers being connected so that the currents they supply to the pilot system are normally additive, a resistance connected in series in the third pilot wire of the shortest leg of the pilot wire system for making the length of the leg electrically equivalent to the length of the shorter of the other two legs and thus providing equipotential points in the three pilot wires at the same position on the system, an auxiliary transformer at each end of the main feeder and at the end of the branch feeder having two similar primary windings respectively connected in series in opposition in the two pilot wires constituting the pair of "split" pilot wires, a tripping relay device for each circuit-breaker connected to the secondary winding of the adjacent auxiliary transformer so that it is operated to open the circuit-breaker when the currents flowing through the "split" pilot wires are unequal, and a short-circuiting connection between normally equipotential points on one of the "split" pilot wires and the third pilot wire so that the currents flowing in the "split" pilot wires are unequal when there is a fault in the protected section.

In testimony whereof I have signed my name to this specification.

HENRY LEBEN.